United States Patent [19]

Adrian et al.

[11] 4,138,261

[45] Feb. 6, 1979

[54] HARDENERS FOR USE IN WATER-GLASS CEMENT COMPOSITIONS AND PROCESS FOR MAKING THEM

[75] Inventors: Renate Adrian; Raban von Schenck, both of Hürth; Bernd Cox, Elz; Peter Wirtz, Königsstein, all of Fed. Rep. of Germany

[73] Assignee: Hoechst Aktiengesellschaft, Frankfurt am Main, Fed. Rep. of Germany

[21] Appl. No.: 881,727

[22] Filed: Feb. 27, 1978

[30] Foreign Application Priority Data

Mar. 3, 1977 [DE] Fed. Rep. of Germany ....... 2709189

[51] Int. Cl.$^2$ ................................................ C04B 31/02
[52] U.S. Cl. ....................................................... 106/84
[58] Field of Search ............................................. 106/84

[56] References Cited

U.S. PATENT DOCUMENTS

| | | | |
|---|---|---|---|
| 3,445,257 | 5/1969 | Hloch et al. | 106/84 |
| 3,669,699 | 6/1972 | Doi et al. | 106/84 |
| 3,813,253 | 5/1974 | Neises | 106/84 |
| 3,943,231 | 3/1976 | Wasel-Nielen et al. | 106/84 |

*Primary Examiner*—James Poer
*Attorney, Agent, or Firm*—Connolly and Hutz

[57] ABSTRACT

Hardeners of condensed aluminum phosphates for use in water-glass cementing compositions and process for making them. The hardeners consist substantially of a short chain aluminum polyphosphate with a chain length of 3 to 6 and a long chain aluminum polyphosphate with a chain length of more than 40. Quick-setting hardeners contain a high proportion of the short chain component and slow-setting hardeners contain a high porportion of the long chain component.

5 Claims, No Drawings

HARDENERS FOR USE IN WATER-GLASS CEMENT COMPOSITIONS AND PROCESS FOR MAKING THEM

This invention relates to hardeners of condensed aluminum phosphates containing $P_2O_5$ and $Al_2O_3$ in a molar ratio of at least 1.5:1 for use in water-glass cement compositions, and to a process for making these hardeners.

Water-glass cement compositions are widely used as acid-resistant construction materials, in chemistry and in the construction of furnaces. These cementing compositions normally comprise an acid-resistant or refractory filler, such as quartz powder or chamotte, an alkali metal orthosilicate and a hardness-inducing binder, which liberates silica gel hardening the cementing compositions.

Condensed aluminum phosphates which are suitable for use as hardeners in water-glass cement compositions, have already been described in German Patent Specification No. 1,252,835. As disclosed therein, the phosphates are made by subjecting an acid aluminum phosphate containing $P_2O_5$ and $Al_2O_3$ in a ratio of 1.1 to 3:1 to thermal treatment. More specifically, in a first step, the phosphate is heated to constant weight at a temperature of at most 400° C. and, in a second step, the phosphate is heated once again to constant weight at a temperature of at most 750° C.

German Patent Specification "Offenlegungsschrift" No. 1,767,460 describes a process for making condensed aluminum phosphates containing phosphorus pentoxide and aluminum trioxide in a ratio of 1.1 to 3:1, wherein a soluble linear or cyclic condensed alkali metal polyphosphate is reacted with a soluble aluminum salt in water, and the resulting condensed aluminum phosphate is subjected to a one step heat treatment at a temperature of 300° to 600° C.

A further process for making condensed aluminum phosphates, which contain $P_2O_5$ and $Al_2O_3$ in a molar ratio of at least 1.5:1, are X-ray amorphous and have a bulk density of 50 to 200 g/l, has been disclosed in German Patent Specification No. 2,230,175, wherein an aluminum orthophosphate solution or suspension is sprayed through a flame in a tower maintained at temperatures of 250° to 700° C., the issuing gas having a temperature of 100° to 500° C. The resulting spray product may subsequently be subjected to further heat treatment, which enables the properties of the final product to be varied so as to obtain a quick-setting or slow-setting hardener for use in water-glass cement compositions.

A still further process for making condensed aluminum phosphates containing $P_2O_5$ and $Al_2O_3$ in a molar ratio of at least 1.5:1 has been described in German Patent Specification No. 2,264,475, wherein an aluminum orthophosphate solution or suspension is subjected to thermal treatment. To this end, the aluminum orthophosphate solution or suspension is spraydried in a tower in contact with hot gas maintained at a temperature of 250° to 700° C. and thereby converted directly to condensed aluminum phosphate. The spray product so made may subsequently be annealed, if desired or convenient. Condensed aluminum phosphates which are suitable for use as quick-setting hardeners in water-glass cement compositions are obtained by spray-drying the solution or suspension at a temperature of 300° to 400° C., and condensed aluminum phosphates, which are suitable for use as slow-setting hardeners, are obtained by spray-drying the solution or suspension at a temperature of 400° to 600° C.

Aluminum phosphates capable of setting a water-glass cement composition within a predetermined period of time are obtained by spray-drying the solution or suspension at a temperature of 300° to 400° C. and subjecting the resulting spray product to further heat treatment.

More specifically, condensed aluminum phosphates capable of setting a cement composition within 10 to 50 minutes are obtained by annealing the spray product over a period of 10 to 60 minutes at 400° to 600° C. The temperature which is to be selected for annealing the spray product should be the higher the longer the setting period desired for the hardener within the limits specified, and the annealing period should be the shorter the shorter the setting period desired for the hardener.

While substantially all of the condensed aluminum phosphates made by the processes described hereinabove or a similar process are suitable for use as hardeners in a water-glass cement composition, the fact remains that their setting power varies in accordance with the particular conditions selected for their preparation.

As to the users of aluminum phosphate-hardeners, it is highly desirable for them to have cementing compositions which set uniformly within a predetermined period of time.

This, however, cannot be achieved with the use of hardeners prepared by any of the known processes of which we are aware. The reason for this resides in the fact that the processes described heretofore invariably yield aluminum phosphate mixtures of undefined and continually varying composition which cannot be controlled. Needless to say, compositions of hardeners and cement of which the setting time varies substantially in uncontrollable manner cannot be used as widely as would be desirable. In addition to this, it is substantially impossible in the production of aluminum phosphate-hardeners to avoid the formation of defective batches.

The irregular behaviour of the products described hereintofore has contributed to increasing the general interest in hardeners of uniform and predetermined setting power and also the interest in a simple process for making such hardeners.

It is therefore an object of the present invention to provide a simple process for making a hardener permitting the controlled preparation of cementing compositions of different setting times, without the properties of the hardener being impaired.

This object can unexpectedly be achieved by the use of a hardener consisting substantially of a component A comprising a short chain aluminum polyphosphate with a chain length of 3 to 6, corresponding to a water content of 6 to 4 weight %, and a component B comprising a long chain aluminum polyphosphate with a chain length of more than 40, corresponding to a water content of less than 0.5 weight %.

Quick-setting hardeners for use in water-glass cementing compositions contain large proportions of component A and slow-setting hardeners contain large proportions of component B, in the mixture of hardeners. More specifically, those hardeners which enable a cementing composition to set within a period of 4 to 50 minutes contain the components A and B in a ratio by weight of 1:1 to 1:15. They are easy to prepare in reproducible fashion as follows: the component A is made in a first step by subjecting an acid aluminum orthophosphate solution or suspension or a mixture of polyphosphoric acid and aluminum hydroxide containing $P_2O_5$ and $Al_2O_3$ in a molar ratio of at least 1.5:1 to thermal treatment at a temperature of 200° to 350° C. over a period as long as necessary to obtain a product with a chain length of 3 to 6, corresponding to a water-content of 6 to 4 weight % (component A).

Next, the component B is prepared in a second step by subjecting a portion of the component A to annealing treatment at a temperature of 400° to 600° C. over a period as long as necessary to obtain with a chain length of more than 40, corresponding to a water-content of less than 0.5 weight %. The two products so made are then mixed together.

In those cases in which polyphosphoric acid and aluminum hydroxide are used as starting materials, it is good practice for them to be mixed and kneaded in the first step in a reactor heated to 200° to 350° C. It is also advantageous to effect this reaction in continuous manner.

While the cementing compositions used heretofore and those which are made with the hardeners of the present invention have the same properties as regards setting power, acid-resistance and water-proofness, the latter can additionally be varied in controlled manner in respect of setting time and hardening period.

We have more particularly found that it is possible by varying the mixing ratio of short chain to long chain aluminum polyphosphate component to continually vary the setting time. Cementing compositions containing the hardeners of the present invention have at least the same final strength and water-proofness as cementing compositions made with customary hardeners.

The hardeners of the present invention enable the setting times of cementing compositions to be varied in controlled fashion and this is of interest for more widespread use of these hardeners, e.g. for use in quick-setting pneumatic (injection) acid-resistant cementing compositions of which the final strength remains unimpaired.

The hardeners of the present invention are more especially suitable for use in those water-glass cementing compositions which contain 1 to 5 weight % of hardener in admixture with 20 to 35 weight % of an alkali metal orthosilicate and 50 to 80 weight % of filler, such as quartz powder or similar material.

EXAMPLE

An aluminum polyphosphate (molar ratio of $P_2O_5$ to $Al_2O_3$ = 3:1) was made in a first step from aluminum hydroxide and polyphosphoric acid (84 weight % of $P_2O_5$) in a heated kneader at 250° C. and subsequently annealed at 300° C. over a period necessary to obtain a homogenous product with an approximate chain length of 4, corresponding to a water content of 5.5 weight % (short chain acid aluminum polyphosphate; component A).

Next, a portion of component A was further annealed at 500° C. over a period necessary to obtain a product with an approximate chain length of 40, corresponding to a watercontent of 0.5 wt.% (long chain aluminum polyphosphate, component B).

The two components A and B were mixed together in various proportions to give a hardener mixture, of which 3.15 weight % was added in each particular case to a customary cementing composition (about 68% of quartz powder and about 28% of potassium waterglass).

The relationship between the setting times and the ratio selected for mixing the short chain and long chain components together is indicated in the following Table. The "setting time" is defined as hardening period of the cementing composition. The Shore hardness D (SH) after 24 hours was determined in each particular case as described in ASTM D 1484 or DIN (German Industrial Standard) 53 505.

TABLE

| Ratio of short chain to long chain aluminum polyphosphate | Setting time (min) | SH after 24 h |
|---|---|---|
| 1 : 0 | 1 | 45 |
| 1 : 1 | 4 | 56 |
| 1 : 2 | 7 | 55 |
| 1 : 4 | 12 | 45 |
| 1 : 6 | 25 | 45 |
| 1 : 8 | 31 | 40 |
| 1 : 10 | 40 | 55 |
| 1 : 15 | 50 | 61 |

Mean values are given for the setting times.

We claim:

1. Hardeners of condensed aluminum phosphates containing $P_2O_5$ and $Al_2O_3$ in a molar ratio of at least 1.5:1, for use in water-glass cementing compositions, the hardeners consisting substantially of a component A comprising a short chain aluminum polyphosphate with a chain length of 3 to 6, corresponding to a water content of 6 to 4 weight %, and a component B comprising a long chain aluminum polyphosphate with a chain length of more than 40, corresponding to a water content of less than 0.5 weight %, quick-setting hardeners containing a high proportion of said component A and slow-setting hardeners containing a high proportion of said component B.

2. Hardeners as claimed in claim 1, containing the said components A and B in a quantitative ratio of 1:1 to 1:15.

3. A process for making the hardeners as claimed in claim 1, which comprises: preparing the component A in a first step by subjecting an acid aluminum orthophosphate solution or suspension or a mixture of polyphosphoric acid and aluminum hydroxide containing $P_2O_5$ and $Al_2O_3$ in a molar ratio of at least 1.5:1 to thermal treatment at a temperature of 200° to 350° C. over a period as long as necessary to obtain a product with a chain length of 3 to 6, corresponding to a water content of 6 to 4 weight % (component A); preparing the component B in a second step, by subjecting a portion of said component A to annealing treatment at a temperature of 400° to 600° C. over a period as long as necessary to obtain a product with a chain length of more than 40, corresponding to a water content of less than 0.5 weight % (component B); and mixing the said component A with the said component B.

4. The process as claimed in claim 3, wherein, in the first step, the polyphosphoric acid and aluminum hydroxide are mixed and kneaded in a reactor heated to 200° to 350° C.

5. The process as claimed in claim 4, wherein the polyphosphoric acid is continuously mixed and kneaded with the aluminum hydroxide.

* * * * *